US012694675B2

(12) United States Patent
Gaur et al.

(10) Patent No.: US 12,694,675 B2
(45) Date of Patent: Jul. 28, 2026

(54) METHOD TO EXTRACT VIDEO CONTEXT FROM EXTERNAL DESCRIPTION

(71) Applicant: HITACHI, Ltd., Tokyo (JP)

(72) Inventors: Sudhanshu Gaur, Cupertino, CA (US);
Joydeep Acharya, Milpitas, CA (US)

(73) Assignee: HITACHI, LTD., Tokyo (JP)

( * ) Notice: Subject to any disclaimer, the term of this patent is extended or adjusted under 35 U.S.C. 154(b) by 293 days.

(21) Appl. No.: 18/534,315

(22) Filed: Dec. 8, 2023

(65) Prior Publication Data

US 2025/0191366 A1     Jun. 12, 2025

(51) Int. Cl.
*G06V 20/40*       (2022.01)
*G06V 10/82*       (2022.01)
*G06V 20/52*       (2022.01)

(52) U.S. Cl.
CPC .............. *G06V 20/41* (2022.01); *G06V 20/44* (2022.01)

(58) Field of Classification Search
CPC ........ G06V 20/41; G06V 20/44; G06V 10/82; G06V 20/46; G06V 20/52
See application file for complete search history.

(56) References Cited

U.S. PATENT DOCUMENTS

| | | | |
|---|---|---|---|
| 12,079,185 B2 * | 9/2024 | Misiewicz | .......... G06F 16/3347 |
| 2022/0300786 A1 * | 9/2022 | Krishna Murthy | .... G16Y 10/75 |

| | | | |
|---|---|---|---|
| 2025/0111204 A1 * | 4/2025 | Eggert | ................ G06F 16/3347 |
| 2025/0173519 A1 * | 5/2025 | Chiang | ................. G06F 16/383 |
| 2025/0193462 A1 * | 6/2025 | Govindarajan | ... G06F 16/90335 |

FOREIGN PATENT DOCUMENTS

WO       2023022727 A1     2/2023

OTHER PUBLICATIONS

Jain, Mihir, et al. "Objects2action: Classifying and localizing actions without any video example." Proceedings of the IEEE international conference on computer vision. 2015. (Year: 2015).*

Logeswaran et al., "Unsupervised Task Graph Generation from Instructional Video Transcripts," May 2023, 13 pages.

* cited by examiner

*Primary Examiner* — Wassim Mahrouka
*Assistant Examiner* — Joshua Chen
(74) *Attorney, Agent, or Firm* — PROCOPIO, CORY, HARGREAVES & SAVITCH LLP

(57)                ABSTRACT

Systems and method described herein involve processing a video which can include executing a zero shot image labeler on the video to generate a plurality of labels corresponding to images of the video; calculating an image embedding vector for each of the labels of the images; generating context labels to replace the each of the labels corresponding to each of the images based on context labels determined for current and previous images in time by referencing a context database with the image embedding vector to determine the context labels from an inspected event graph, wherein nodes of the event graph are indicative of events that can happen during a duration of the video; and replacing the each of the plurality of labels with the generated context labels.

14 Claims, 12 Drawing Sheets

| Images from Input Video (201) | Zero Shot Image Labels (203) | Image Labels w/ Context (301), $a_K = 0$ | Image Labels w/ Context (301), Proper $a_K$ |
|---|---|---|---|
| $I_1$ | A conveyer belt in the middle of a room | Both worker and part are not present at the inspection point | Both worker and part are not present at the inspection point |
| $I_2$ | Man looking at equipment on conveyer belt while standing | Part arrives at the inspection point, worker is present and conducting inspection | Part arrives at the inspection point, worker is present and conducting inspection |
| $I_3$ | Man standing near a conveyer belt with an equipment on it | Part arrives at the inspection point, worker is present and conducting inspection | Part leaves the inspection point, worker is present and not conducting inspection |

| ID | Node_ID | Description | Embedding | Estimated Duration (secs) | Level |
|---|---|---|---|---|---|
| 0 | Node001 | Both worker and part are not present at the inspection point | $V \in R^n$ | N/A | 0 |
| 1 | Node002 | Part arrives at the inspection point but worker is not present | $V \in R^n$ | 5 | 1 |
| 2 | Node003 | Part arrives at the inspection point, worker is present but not conducting inspection | $V \in R^n$ | N/A | 2 |
| 3 | Node004 | Part arrives at the inspection point, worker is present and conducting inspection | $V \in R^n$ | 5 | 3 |
| 4 | Node005 | Part leaves the inspection point, worker is present and not conducting inspection | $V \in R^n$ | 10 | 4 |

FIG. 4

| ID | Edge_ID | Starting Node | End Node | Conditions |
|----|---------|---------------|----------|------------|
| 1 | Edge001 | Node001 | Node002 | none |
| 2 | Edge002 | Node002 | Node003 | none |
| 3 | Edge003 | Node003 | Node004 | none |
| 4 | Edge004 | Node004 | Node005 | none |

FIG. 5

| ID | Node_ID | Description | Embedding | Estimated Duration (secs) | Level |
|---|---|---|---|---|---|
| 0 | Node001 | Place magnifying glass over object | $V \in R^n$ | 5 | 0 |
| 1 | Node002 | Read work order for left side specs | $V \in R^n$ | 20 | 1 |
| 2 | Node003 | Inspect the left side of the object | $V \in R^n$ | 10 | 2 |
| 3 | Node004 | Read work order for right side specs | $V \in R^n$ | 20 | 1 |
| 4 | Node005 | Inspect the right side of the object | $V \in R^n$ | 10 | 2 |
| 5 | Node006 | Sign off work completion in kiosk | $V \in R^n$ | N/A | 3 |
| 6 | Node007 | Throw part in defect bin | $V \in R^n$ | 10 | 4 |
| 7 | Node008 | Press button to move the part forward | $V \in R^n$ | 5 | 4 |
| 8 | Node-n-001 | Pick up part to adjust its postion | $V \in R^n$ | N/A | -1 |

FIG. 7

| ID | Edge_ID | Starting Node | End Node | Conditions |
|----|---------|---------------|----------|------------|
| 1 | Edge001 | Node001 | Node002 | none |
| 2 | Edge002 | Node001 | Node003 | none |
| 3 | Edge003 | Node001 | Node-n-001 | NOT |
| 4 | Edge004 | Node002 | Node004 | none |
| 5 | Edge005 | Node003 | Node005 | none |
| 6 | Edge006 | Node004 | Node006 | AND with Node005 |
| 7 | Edge007 | Node005 | Node006 | AND with Node004 |
| 8 | Edge008 | Node006 | Node007 | none |
| 9 | Edge009 | Node006 | Node008 | none |

FIG. 8

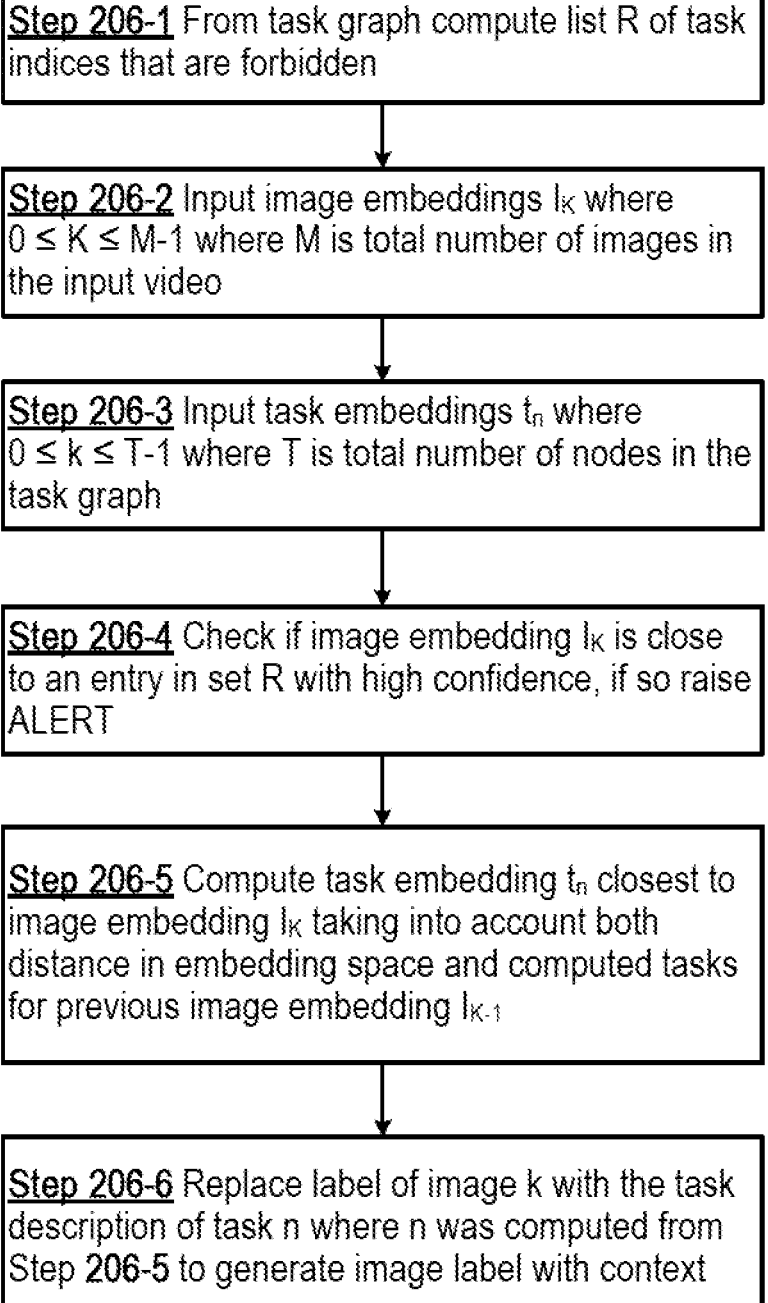

Step 206-1 From task graph compute list R of task indices that are forbidden

Step 206-2 Input image embeddings $I_K$ where $0 \leq K \leq M-1$ where M is total number of images in the input video

Step 206-3 Input task embeddings $t_n$ where $0 \leq k \leq T-1$ where T is total number of nodes in the task graph

Step 206-4 Check if image embedding $I_K$ is close to an entry in set R with high confidence, if so raise ALERT

Step 206-5 Compute task embedding $t_n$ closest to image embedding $I_K$ taking into account both distance in embedding space and computed tasks for previous image embedding $I_{k-1}$

Step 206-6 Replace label of image k with the task description of task n where n was computed from Step 206-5 to generate image label with context

FIG. 9

Step 207-1 Determine that a new task has started at time K

Step 207-2 Initialize $a_K$ to a low value $a_0$

Step 207-3 Read the Estimated Duration of the new task T

Step 207-4 For Each subsequent time instant K+i, increase $a_K$ as $a_K = a_0 \exp\left(\dfrac{iw}{T}\right)$ where w is a constant

METHOD TO EXTRACT VIDEO CONTEXT FROM EXTERNAL DESCRIPTION

BACKGROUND

Field

The present disclosure is generally directed to video systems, and more specifically, to systems and methods to extract video context from external descriptions.

Related Art

For many industrial applications, there is a need to observe activity involving workers and their interactions with industrial assets or tools and draw inferences. For example, there can be a need to observe a worker perform a repetitive task and compute how much time it takes for the worker to complete each cycle of a task, along with the variation of such time across multiple cycles of the same task. This is called the cycle time computation.

In another example, there can be a need to observe if the worker is maintaining or violating standard operating procedure (SOP) for industrial activities. For example, SOP can be directed to a strictly defined procedure for assembling a part such as any violation needs to be reported to the appropriate authorities such as the line supervisor.

Another more general example can involve observing an industrial setting to be able to draw certain conclusions about occurrence of certain events based on a combination of state of assets and workers. Traditionally these observation and inference processes were done by the line supervisor themselves, which is inefficient as the supervisor cannot be in all places at the same time, and is also prone to human error and biases. Hence, with the advent of Industrial IoT (IoT), these observations have been increasingly performed by placing a sensor (such as video camera) to record an industrial setting (such as a factory) and using Artificial Intelligence (AI) on the data to be able to infer what is going on in the factory. The inference can involve some conclusion about events occurring in the factory based on a combination of state of assets and workers. The inference could also infer worker behavior and worker task related Key Performance Indicators (KPIs) such as SOP compliance or violation and cycle time.

The prevalent approach to solving such problems using AI on image data is to use image classification where the different classes could be 'cycle start' and 'cycle stop' for cycle time computation and 'normal action', 'prohibited action', 'unknown action' and so on, for SOP compliance, or 'event A' start for generalized event-based analysis. In order to train such classification machine learning (ML) models, training data involving labeled images would need to be prepared. For labeling an image, the context of that image needs to be understood—i.e. what kind of industrial activity or event is happening in the image. Often this is specialized information available only to the industrial domain expert.

FIG. 1 illustrates an example related art system for image labeling for machine learning (ML) model training. As shown in FIG. 1, the data engineer 401 needs to have a joint session with the industrial domain expert 101 where the expert looks at a bunch of images from input video 201 and explains what industrial activity is happening in each image. Based on this information, the data engineer 401 labels the images with context information to produce image labels with context 301.

As can be expected, this process is not scalable due to the manual nature of human interaction between the domain expert and the data engineer. Industrial activities are highly specialized and so this needs to be performed every time the video analytics solution is to be implemented for a new industrial assembly line or a new factory. This is because even if the common problem is same for SOP compliance, what SOP means will change across different assembly lines or factories and so data has to be trained accordingly. It has to be kept in mind that a large scale labeled image database with all possible variations of data is not available for industrial scenarios in the way there are databases available for publicly available images. The primary reason for the lack of the industrial scenario of a large scale labeled image database is the sensitive information that they carry. Thus, training needs to be done for each new industrial scenario.

SUMMARY

The related art implementations thereby suffer from the increased time to scale an AI solution in a new industrial setting such as new assembly line or new factory as well as the associated cost of hiring data engineer resources.

In example implementations, the domain context about an industrial activity that has been computed based on natural language input from a domain expert is utilized, and further involve a method to automatically label images in a video which observes subsequent instances of that industrial activity without the need of a data engineer, where the label has the domain context.

Aspects of the present disclosure can involve a method, which can include, for receipt of a video for processing, executing an image labeler on the video to generate a plurality of labels corresponding to images of the video; calculating an image embedding vector for each of the labels of the images; generating context labels to replace the each of the labels corresponding to each of the images based on context labels determined for current and previous images in time by referencing a context database with the image embedding vector to determine the context labels from an inspected event graph, wherein nodes of the event graph are indicative of events that can happen during a duration of the video; and replacing the each of the plurality of labels with the generated context labels.

Aspects of the present disclosure can involve a system, which can include, for receipt of a video for processing, means for executing an image labeler on the video to generate a plurality of labels corresponding to images of the video; calculating an image embedding vector for each of the labels of the images; means for generating context labels to replace the each of the labels corresponding to each of the images based on context labels determined for current and previous images in time by referencing a context database with the image embedding vector to determine the context labels from an inspected event graph, wherein nodes of the event graph are indicative of events that can happen during a duration of the video; and means for replacing the each of the plurality of labels with the generated context labels.

Aspects of the present disclosure can involve a computer program which can include instructions involving, for receipt of a video for processing, executing an image labeler on the video to generate a plurality of labels corresponding to images of the video; calculating an image embedding vector for each of the labels of the images; generating context labels to replace the each of the labels corresponding to each of the images based on context labels determined for current and previous images in time by referencing a context database with the image embedding vector to determine the context labels from an inspected event graph, wherein nodes of the event graph are indicative of events that can happen during a duration of the video; and replacing the each of the plurality of labels with the generated context labels. The computer program and instructions can be stored on a non-transitory computer readable medium and executed by one or more processors.

Aspects of the present disclosure can involve an apparatus, which can include, a processor, configured to, for receipt of a video for processing, execute an image labeler on the video to generate a plurality of labels corresponding to images of the video; calculate an image embedding vector for each of the labels of the images; generate context labels to replace the each of the labels corresponding to each of the images based on context labels determined for current and previous images in time by referencing a context database with the image embedding vector to determine the context labels from an inspected event graph, wherein nodes of the event graph are indicative of events that can happen during a duration of the video; and replace the each of the plurality of labels with the generated context labels.

Aspects of the present disclosure can involve a system, which can include a context database; and a processor, configured to, for receipt of a video for processing, execute an image labeler on the video to generate a plurality of labels corresponding to images of the video; calculate an image embedding vector for each of the labels of the images; generate context labels to replace the each of the labels corresponding to each of the images based on the context labels determined for current and previous images in time by referencing the context database with the image embedding vector to determine the context labels from an inspected event graph, wherein nodes of the event graph are indicative of events that can happen during a duration of the video; and replace the each of the plurality of labels with the generated context labels.

BRIEF DESCRIPTION OF THE DRAWINGS

FIG. 4 illustrates an example of the context information (Node Table) for the inspection event graph, in accordance with an example implementation.

FIG. 5 illustrates an example of context information (Edge Table) for inspection event graph, in accordance with an example implementation.

FIG. 7 illustrates context information (Node Table) for the inspection task graph, in accordance with an example implementation.

FIG. 8 illustrates context information (Edge Table) for inspection task graph, in accordance with an example implementation.

FIG. 9 illustrates a context generator module, in accordance with an example implementation.

DETAILED DESCRIPTION

Figure 1:
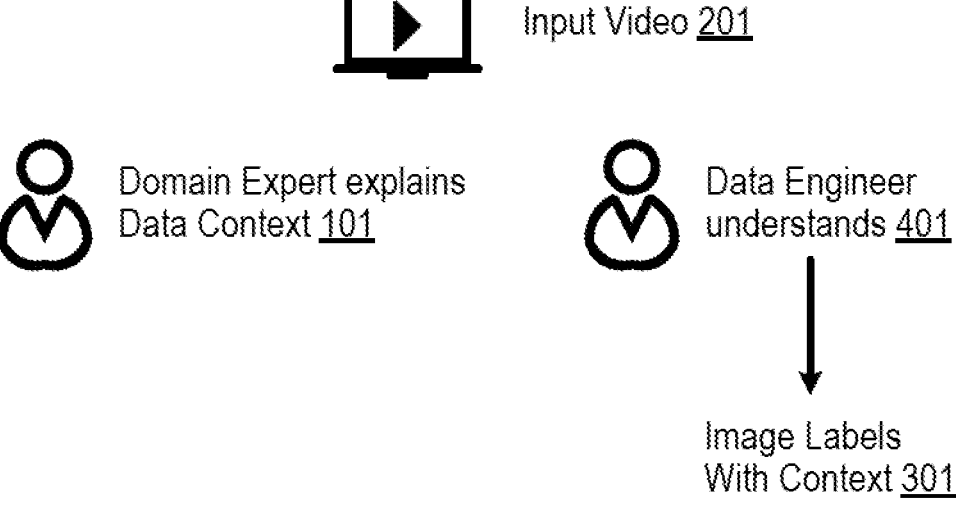
FIG. 1 illustrates an example related art system for image labeling for machine learning (ML) model training.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented in any manner in accordance with the desired implementation.

Figure 2:
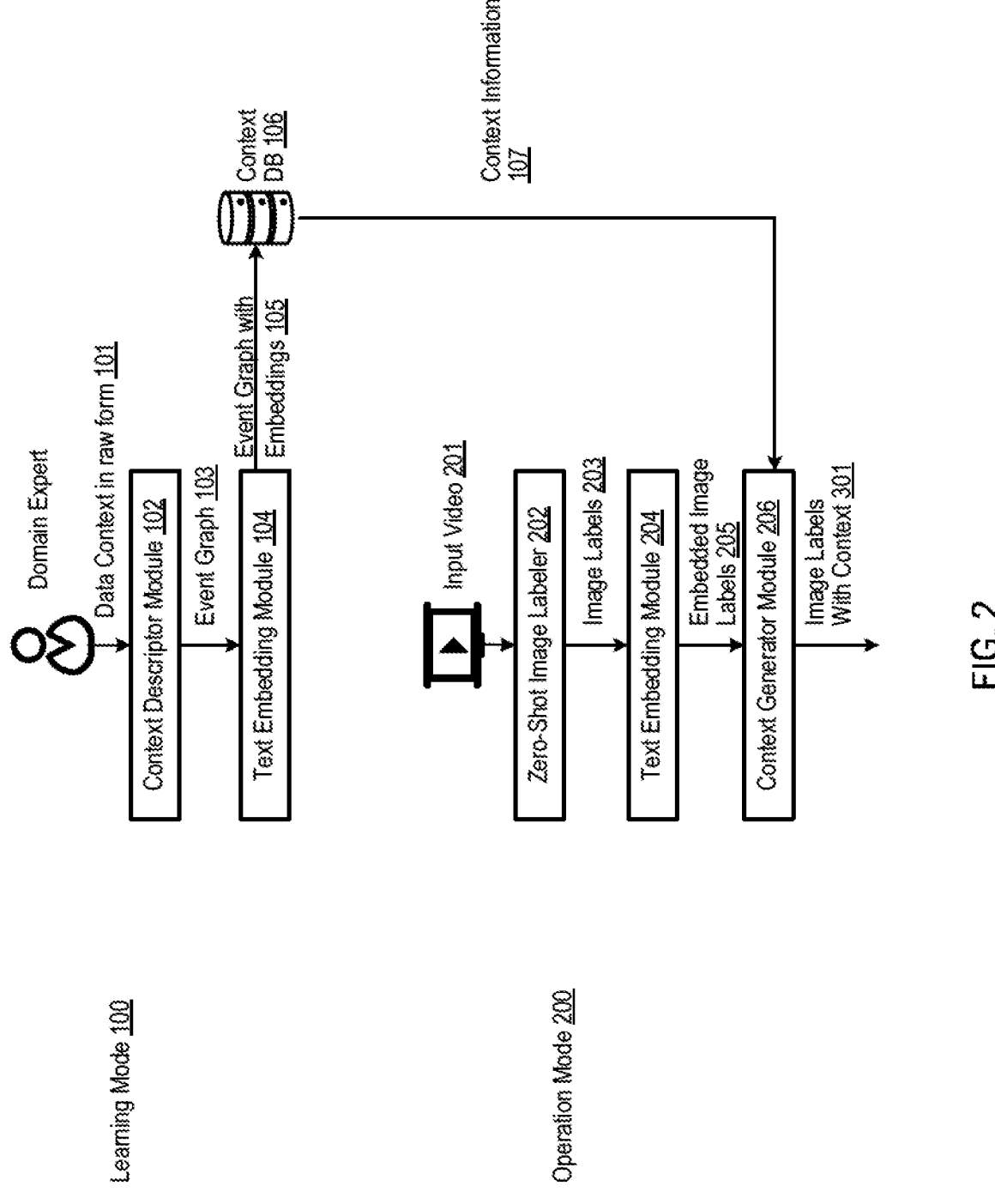
FIG. 2 illustrates an example system diagram, in accordance with an example implementation.

FIG. 2 illustrates an example system diagram, in accordance with an example implementation. The example system can involve the learning mode 100 and the operational mode 200.

In the learning mode 100, the domain expert explains the data context in raw form 101 using natural language. There could be a variety of forms that the raw form data 101 can take. For example, such data can involve the expert typing some text, or can involve the text transcript of the expert speaking. Instead of a human expert, it could be a manual from which key information has been extracted via a computer algorithm to construct raw form data 101.

The raw form data input 101 is then fed to a context descriptor module 102, which outputs an event graph which documents the graphical relationship between various events that are described in raw form data input 101. This could be done manually for only one sample of raw form data input 101. For multiple samples (e.g., inputs from multiple domain experts) a generalized approach can be followed as known in the related art. One way to generalize would be to consider events and not just tasks. Even for tasks, the additional possibility that the time taken to perform each of these steps can also be extracted from the domain expert input.

Figure 3:
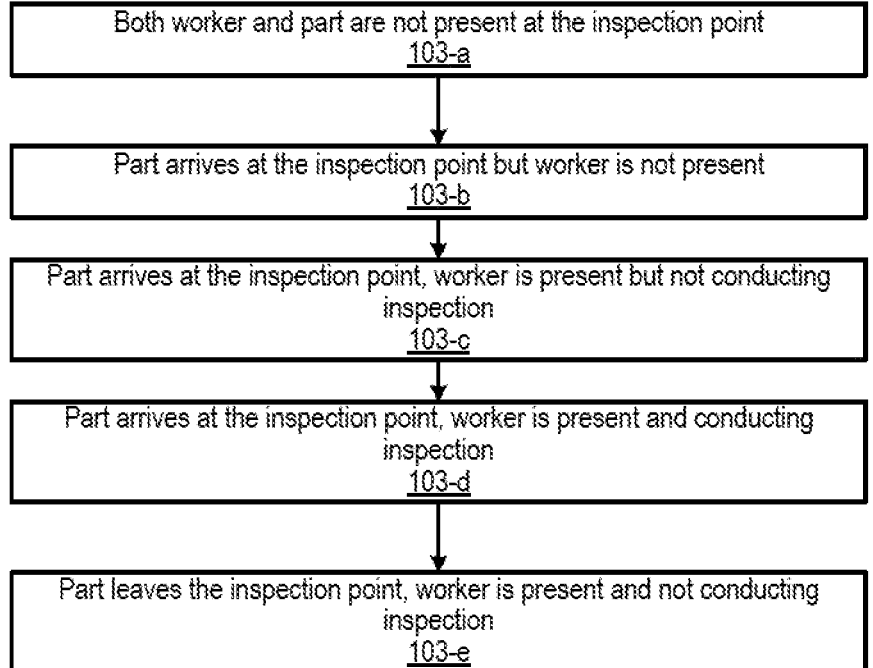
FIG. 3 illustrates an example of the inspect event graph, in accordance with an example implementation.

FIG. 3 illustrates an example of the inspect event graph 103, in accordance with an example implementation. For purposes of exposition, consider an example event graph in FIG. 3. This is an example where the event sequence describes a typical workflow related to inspection of a part at an inspection point. In the example of FIG. 3, the nodes of the event graph can involve, but are not limited to, both the worker and the part are not present at the inspection point 103-a, the part has arrived at the inspection point but the worker is not present 103-b, the part arrives at the inspection point and the worker is present but not conducting inspection 103-c, part arrives at the inspection point and the worker is present and conducting the inspection 103-d, and part leaves the inspection point and the worker is present and not conducting inspection 103-e.

The Text Embedding Module 104 takes the text in the event graph and embeds them into a higher dimensional vector. This may be done by a variety of embedding solutions available in the related art that takes a sentence as a string of characters for input, and outputs a N dimensional vector of real numbers such that sentences whose semantic meanings are close have embedding vectors that are close to each other in Euclidean sense. For examples the sentences "I like Lionel Messi" and "My favorite sport is soccer" will produce embedding vectors u and v such that $|u-v|^2$ is a small value.

The event graph with embeddings 105 is stored in the context database 106. The context database 106 involves two tables. Context database 106 can be implemented by any type of hardware database in accordance with the desired implementation, such as, but not limited to, storage systems, cloud based systems, and so on.

FIG. 4 illustrates an example of the context information 107 (Node Table) for the Inspection Event Graph, in accordance with an example implementation. The first table is the Node Table as shown in FIG. 4 for the Inspection Event Graph example from FIG. 3. The table can include the following information:

An ID field to count the number of entries.

A NodeID field that uniquely names a node of a graph such that the node contains the event information.

A Description field that contains the text describing what the event is about which has been generated from the input of the domain expert.

An Embedding field which is a N dimensional real vector showing the corresponding embedding value of the text in the Description field. The value of N depends on the specific embedding method. For example, N=512 is a default value for related art embedding CLIP.

An Estimated Duration field which shows the estimated duration of the event. This can be computed from the input given by the domain expert if specified. If not specified, the field is denoted as N/A or Not Available.

A Level field which shows the depth of the graph where the node is located.

FIG. 5 illustrates an example of context information 107 (Edge Table) for Inspection Event Graph, in accordance with an example implementation. The second table is the Edge Table as shown in FIG. 5 for the Inspection Event Graph example from FIG. 3. The table can include the following information:

An ID field to count the number of entries.

An EdgeID field that uniquely names an edge of a graph connecting the nodes that contain the event information.

A Starting Node field that names the starting node of the given edge.

An End Node field that names the end node of the given edge.

A Conditions field that captures special conditions that are additionally required to capture the dependencies between the events, if any. For the example above there are no special conditions.

Figure 6:
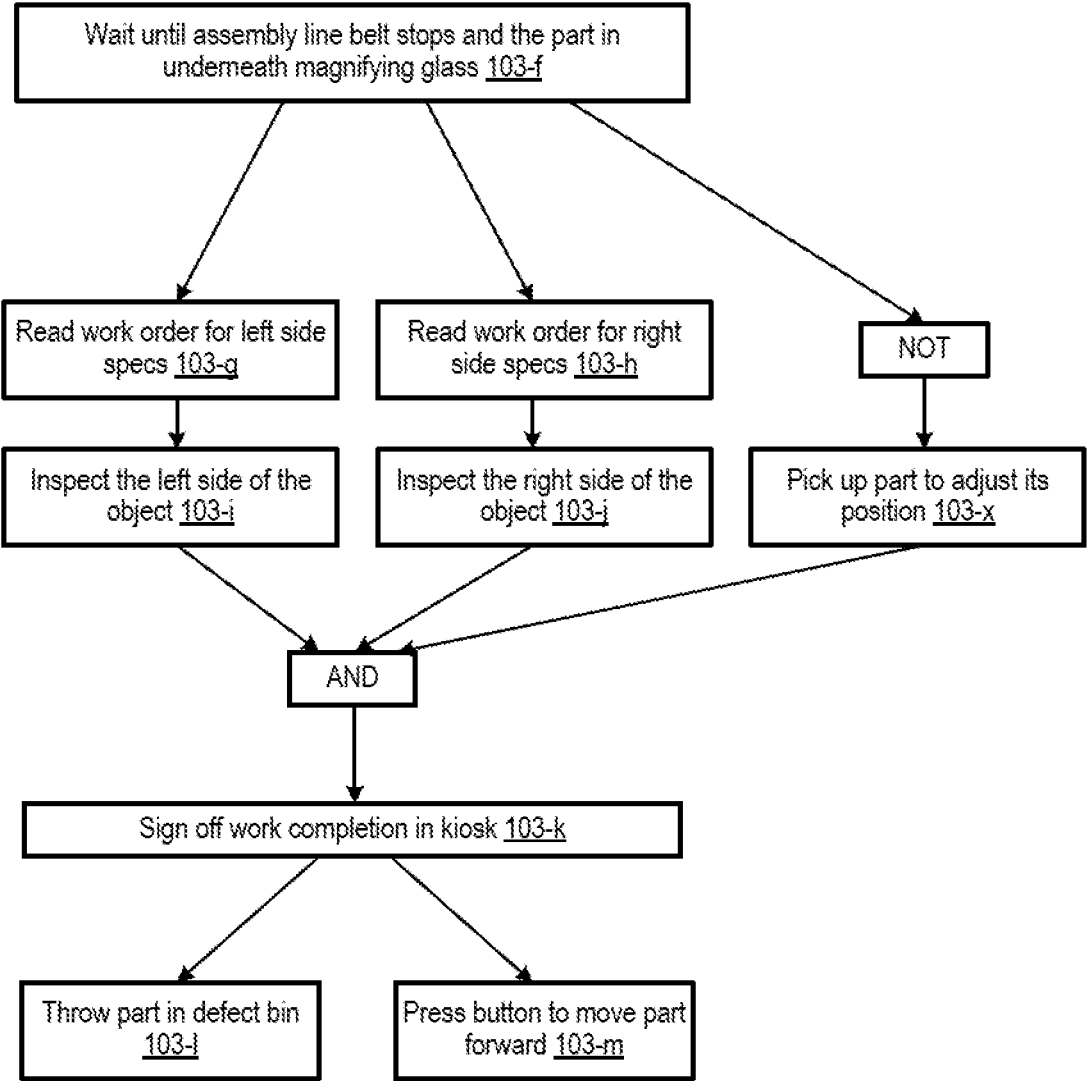
FIG. 6 illustrates an example inspection task graph, in accordance with an example implementation.

FIG. 6 illustrates an example inspection task graph, in accordance with an example implementation.

To consider how the solution may unfold for more generalized events, consider a more detailed Inspection Event Graph as shown in FIG. 6. Here, the events only capture the detailed tasks that the worker has to perform. This is referred to as herein as the Inspection Task Graph where 'task' is used interchangeably with 'event' only for this type of situation.

In the first step 103-*f*, the worker stands in front of assembly line belt and waits for a part to arrive and stop under a magnifying glass meant for inspection. The worker then consults a work order to determine what specifications that should be checked for both the right 103-*h* and left sides 103-*g* of the part. After the specifications of any one side has been consulted, the worker proceeds to inspect side of the part 103-*i*, 103-*j*. It does not matter which part the worker starts to inspect first. Only after both sides have been inspected may the worker then move to the next step which is to sign off in the Manufacturing Execution System (MES) kiosk 103-*k* that the work has been completed. After the completion of the work the worker takes either of the two actions depending on whether she determined the overall part was defective or not, such as throwing the part into the defect bin 103-*l*, or pressing the button to move the part forward 103-*m*.

Additionally, the event list also describes a task that worker is not supposed to do for example pick the part up (step 103-*x*).

Note that the steps that should not be done, such as step 103-*x*, are depicted in a manner that is novel in contrast to the related art.

FIG. 7 illustrates context information 107 (Node Table) for the inspection task graph, in accordance with an example implementation. The Node Table is illustrated in FIG. 7 for the Inspection Task Graph example from FIG. 6. Note that some events (tasks) are at the same level now denoting tasks which can be performed in any order. Also note that the events (tasks) that are forbidden are marked with special level numbers (e.g., −1 for node denoting the forbidden action of picking up the part).

FIG. 8 illustrates context information 107 (Edge Table) for inspection task graph, in accordance with an example implementation. The edge table is shown in FIG. 8 for the inspection task graph example. As noted, the conditions field now captures special conditions that are additionally required to capture the dependencies between the tasks such as the AND and NOT conditions.

In the operation mode 200, the example implementations involve automatically labeling a video that is observing the same activity for which the domain expert had provided input in the learning mode 100.

An input video 201 is passed through a zero-shot image labeler 202 to produce text-based image labels 203. These labels are based on a pre-trained model (hence the name zero-shot) on a large corpus of public data set. Thus, the labels 203 are somewhat correlated to the activity happening in the input video 201 but cannot fully capture the domain context (as the training data for 202 was public sourced and did not include domain specific data).

The text labels 203 are passed through a text embedding module 204 which is same as the text embedding module 104 to output embeddings of image labels 205. This is then passed to the Context Generator Module 206.

FIG. 9 illustrates a context generator module, in accordance with an example implementation. The Context Generator Module involves the following steps.

In step 206-1, the context generator module computes list R of task embeddings for events that are forbidden from the event graph. These would include examples such as event with index=−1 in FIG. 7.

In step 206-2, the context generator module inputs image embeddings $I_K$ where $0 \leq K \leq M-1$ where M is total number of images in the input video.

In step 206-3, the context generator module inputs event embeddings $t_n$ where $0 \leq n \leq T-1$ where T is total number of nodes in the task graph with valid actions such that $t_n$ does not belong to R from step 206-1.

In step 206-4, the context generator module checks if image embedding $I_K$ is close to an entry in set R with high confidence. To perform this, the context generator module computes the following, $$\min_{r \in R} D(I_K, r) < Th$$

where D (x,y) computes a distance between two vectors x and y such as the Euclidean distance. If the condition is true, then an alert is raised. To understand the significance of this condition consider the case when the overall application was for SOP compliance. Then this condition means that an SOP violation has occurred.

At step 206-5, the context generator module computes event embedding $t_n$ closest to image embedding $I_K$ considering both distance in embedding space and computed tasks for previous image embedding $I_{K-1}$. To perform this, compute the following, $$n_K = \mathrm{argmin}_{n < T} [D(I_K, t_n) + \alpha_K d(n, n_{K-1} + 1)]$$

where d (a, b) computes the distance between the nodes a and b in the event graph. Thus, this term, at time K tries to incentivize $n_K$ to be the node in the task graph which is the next node determined in the previous time instant. In other words, the node in the previous time instant was determined to be $n_{K-1}$ and the next node in eth graph is $n_{K-1}+1$ as the task graph is constructed with the sequence of tasks in mind. The parameter ag shows how much weightage should be given to this term. This is determined as a function of the estimated duration value from the node table as follows.

Find $n_{K-1} \neq n_K$ and set $\alpha_K = \alpha_0$ where $\alpha_0$ is some initial number while for each subsequent i>0 such that $n_{K+i} = n_K$ set $\alpha_{K+i} = \alpha_0 g(i)$ where g(i) is a increasing function of i with the rate of increase directly proportional to the estimated duration value. The idea is that to capture the intuition that once a new task starts and enough time has elapsed until its estimated duration value, then it is expected that the next task to start.

Figure 10:
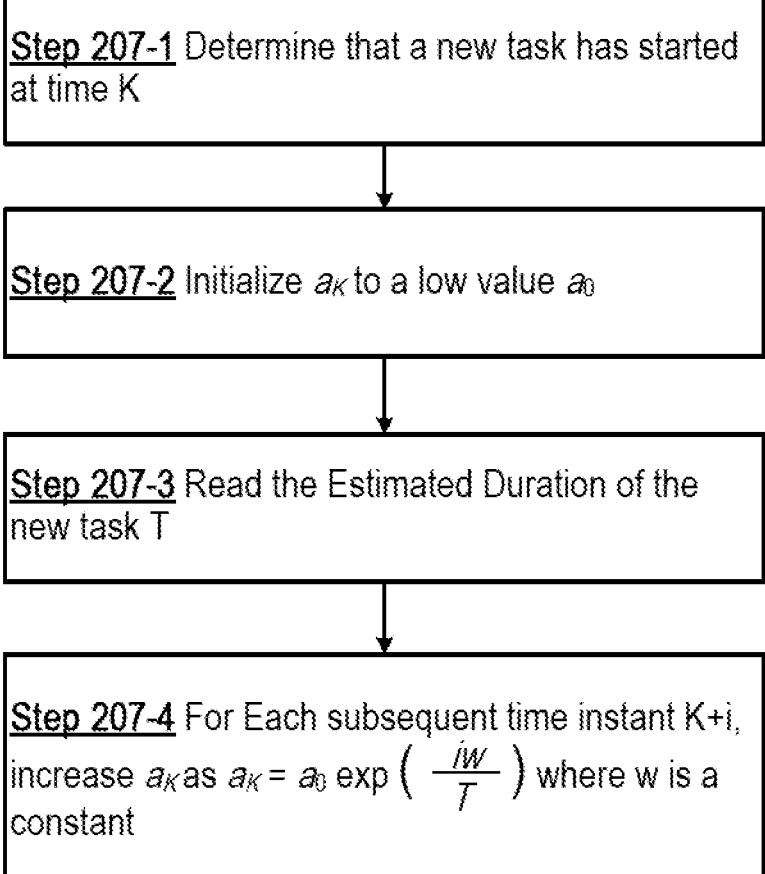
FIG. 10 illustrates an example of event selection based on graphical considerations, in accordance with an example implementation.

FIG. 10 illustrates an example of show to assign values to the weightage parameter $\alpha_K$, in accordance with an example implementation of what was discussed in [0067]

At step 207-1, the event selection determines that a new task has started at time K.

At step 207-2, the event selection initializes $a_K$ to a low value $a_0$.

At step 207-3, the event selection reads the estimated duration of the new task T.

At step 207-4, the event selection, for each subsequent time instant K+i, increase $a_K$ as $a_K = a_0 \exp(iw/T)$ where w is a constant. In this case we have chosen g(i)=exp(iw/T)

At step 206-6, the content generator module replaces the label of image k with the task description of task n where n was computed from step 206-5 to generate image label with context 301.

Figure 11:
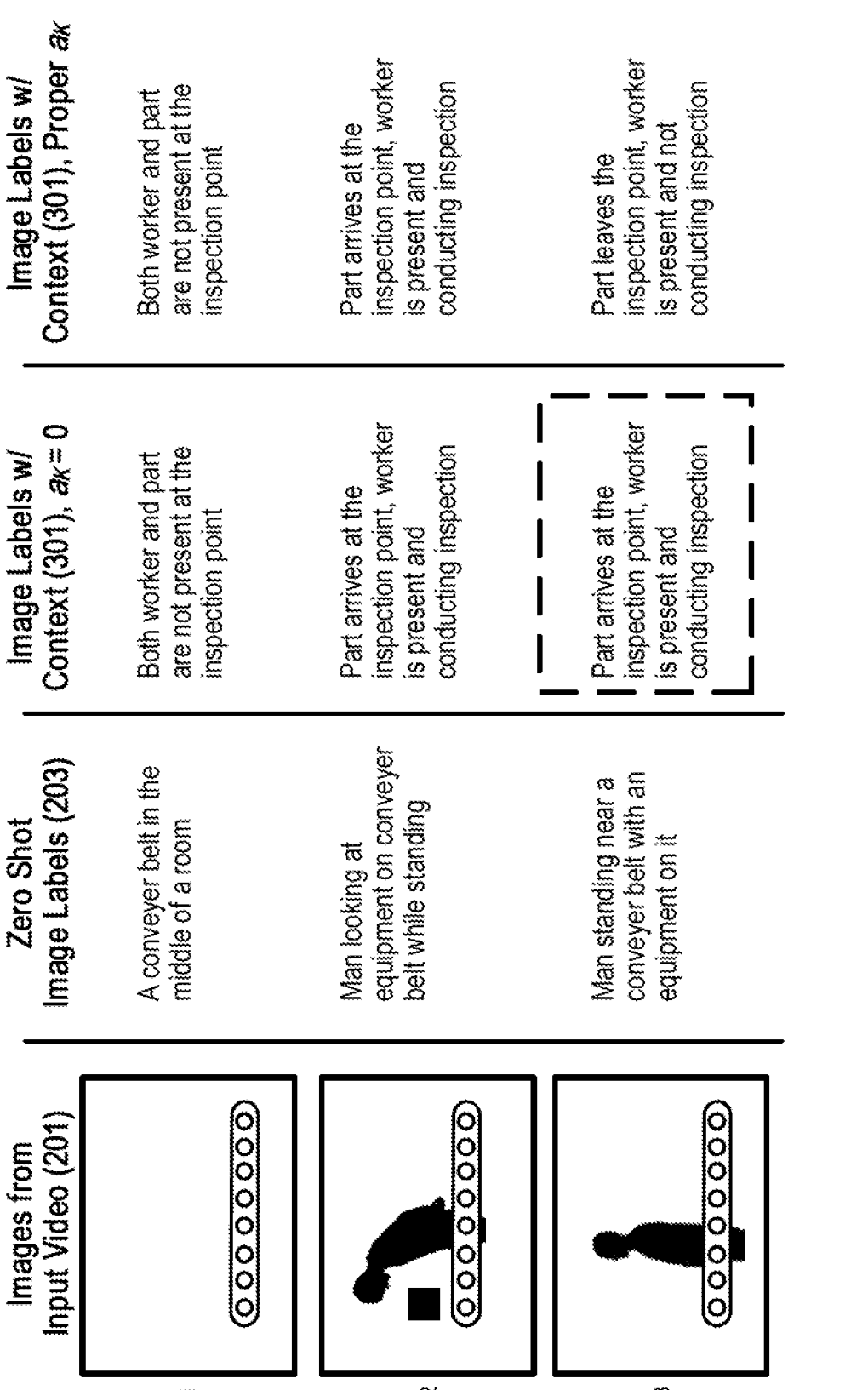
FIG. 11 illustrates an example illustration of a proposed solution that can be provided, in accordance with an example implementation.

In an example, consider the event graph in FIG. 3 for how the solution will work for the situation as shown in FIG. 11. FIG. 11 illustrates an example illustration of a proposed solution that can be provided, in accordance with an example implementation. As shown in FIG. 11, there are three image frames $I_1$, $I_2$ and $I_3$ and the zero-shot image classifier produces descriptions that are not inaccurate but cannot capture the domain context which was mentioned in the event graph FIG. 3. This can be done as an output of the context generator module with proper choice of parameters such as $\alpha_K$. FIG. 11 also illustrates an example of an improper choice of parameters for $a_K=0$ in the dashed line box. In this case, the determination does not take into account the graphical relationship between the events and wrongly predicts that the worker is still conducting the inspection. With incorporation of the proper $a_K$ the solution correctly predicts that the next task should have started.

Through the example implementations described herein, the time to deploy an AI solution that needs image data labeled with domain context can thereby be reduced. Further, the example implementations also reduce cost due to less resources needed for manual data engineering.

Figure 12:
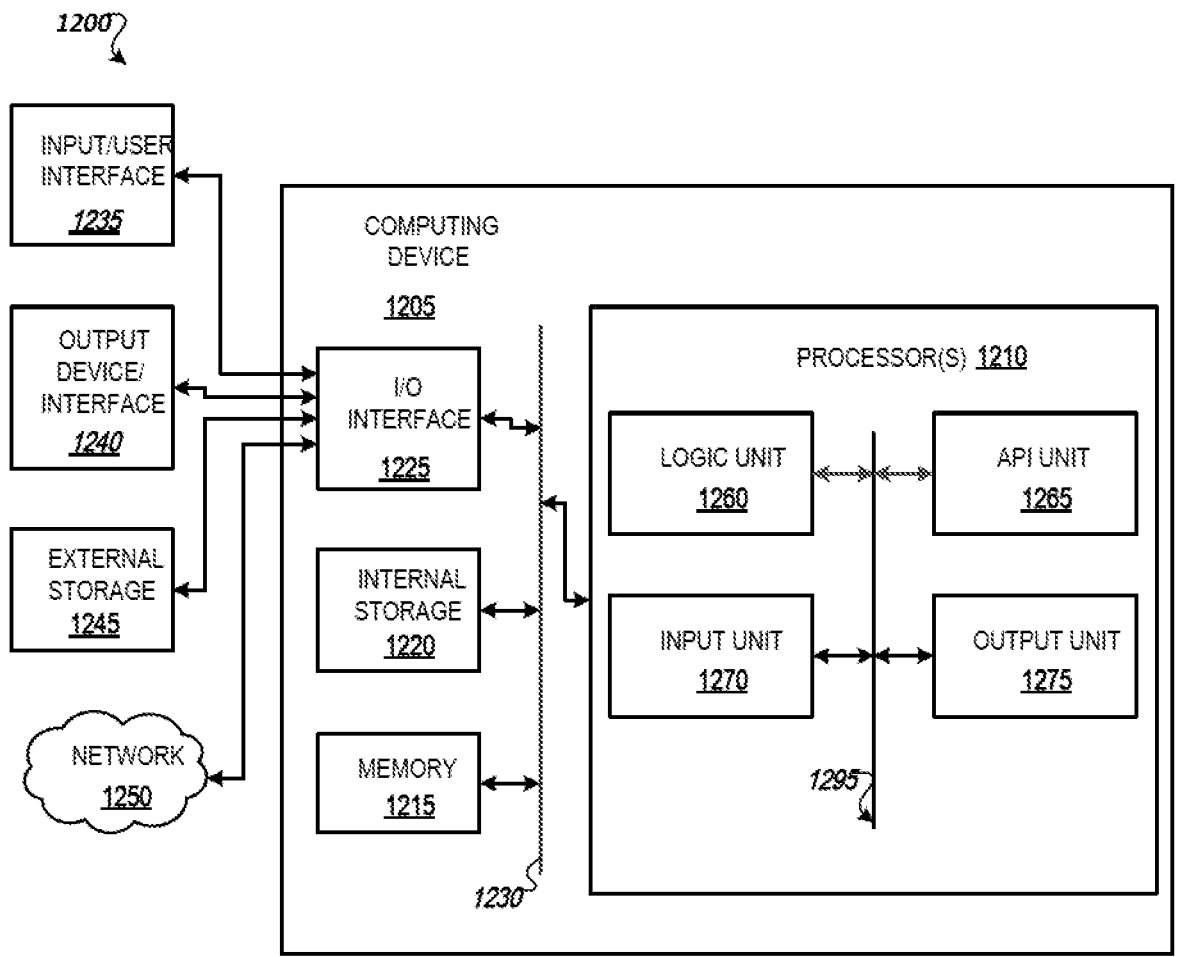
FIG. 12 illustrates an example computing environment with an example computer device suitable for use in some example implementations.

FIG. 12 illustrates an example computing environment with an example computer device suitable for use in some example implementations. Computer device 1205 in computing environment 1200 can include one or more processing units, cores, or processors 1210, memory 1215 (e.g., RAM, ROM, and/or the like), internal storage 1220 (e.g., magnetic, optical, solid-state storage, and/or organic), and/or IO interface 1225, any of which can be coupled on a communication mechanism or bus 1230 for communicating information or embedded in the computer device 1205. IO interface 1225 is also configured to receive images from cameras or provide images to projectors or displays, depending on the desired implementation.

Computer device 1205 can be communicatively coupled to input/user interface 1235 and output device/interface 1240. Either one or both of the input/user interface 1235 and output device/interface 1240 can be a wired or wireless interface and can be detachable. Input/user interface 1235 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1240 may include a display, television, monitor, printer, speaker, braille, or the like. In some example implementations, input/user interface 1235 and output device/interface 1240 can be embedded with or physically coupled to the computer device 1205. In other example implementations, other computer devices may function as or provide the functions of input/user interface 1235 and output device/interface 1240 for a computer device 1205.

Examples of computer device 1205 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1205 can be communicatively coupled (e.g., via IO interface 1225) to external storage 1245 and network 1250 for communicating with any number of networked components, devices, and systems, including one or more computer devices of the same or different configuration. Computer device 1205 or any connected computer device can be functioning as, providing services of, or referred to as a server, client, thin server, general machine, special-purpose machine, or another label.

IO interface 1225 can include but is not limited to, wired and/or wireless interfaces using any communication or IO protocols or standards (e.g., Ethernet, 802.11x, Universal System Bus, WiMAX, modem, a cellular network protocol, and the like) for communicating information to and/or from at least all the connected components, devices, and network in computing environment 1200. Network 1250 can be any network or combination of networks (e.g., the Internet, local area network, wide area network, a telephonic network, a cellular network, satellite network, and the like).

Computer device 1205 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1205 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1210 can execute under any operating system (OS) (not shown), in a native or virtual environment. One or more applications can be deployed that include logic unit 1260, application programming interface (API) unit 1265, input unit 1270, output unit 1275, and inter-unit communication mechanism 1295 for the different units to communicate with each other, with the OS, and with other applications (not shown). The described units and elements can be varied in design, function, configuration, or implementation and are not limited to the descriptions provided. Processor(s) 1210 can be in the form of hardware processors such as central processing units (CPUs) or in a combination of hardware and software units.

In some example implementations, when information or an execution instruction is received by API unit 1265, it may be communicated to one or more other units (e.g., logic unit 1260, input unit 1270, output unit 1275). In some instances, logic unit 1260 may be configured to control the information flow among the units and direct the services provided by API unit 1265, the input unit 1270, the output unit 1275, in some example implementations described above. For example, the flow of one or more processes or implementations may be controlled by logic unit 1260 alone or in conjunction with API unit 1265. The input unit 1270 may be configured to obtain input for the calculations described in the example implementations, and the output unit 1275 may be configured to provide an output based on the calculations described in example implementations.

Processor(s) 1210 can be configured to execute a method or instructions involving, for receipt of a video for processing 201, executing an image labeler 202 on the video to generate a plurality of labels 203 corresponding to images of the video; calculating an image embedding vector for each of the labels of the images; generating context labels 206 to replace the each of the labels corresponding to each of the images based on context labels determined for current and previous images in time by referencing a context database with the image embedding vector to determine the context labels from an inspected event graph, wherein nodes of the event graph are indicative of events that can happen during a duration of the video; and replacing the each of the plurality of labels with the generated context labels 301 as illustrated in FIG. 2 and as described herein with respect to FIG. 11.

Depending on the desired implementation, the context database manages an association between event embedding vectors and context information with each of the nodes in the inspected event graph via event graph with embeddings 105 and as shown at FIG. 5.

Processor(s) 1210 can be configured to execute the method or instructions as described herein, wherein the generating context labels to replace the each of the labels corresponding to each of the images further involves determining a node from the inspected event graph associated with an event embedding vector in the context database having a smallest distance from the image embedding vector; and generating the context labels from context information associated with the node as described with respect to FIG. 9.

Processor(s) 1210 can be configured to execute the method or instructions as described herein, wherein each node is associated with an estimated duration in the context database; wherein a calculated distance between the image embedding vector and the event embedding vector is weighted based on a duration of time between the images of the video and current and previous images in time associated with a same context label, in comparison to the estimated duration as described with respect to FIG. 10.

Depending on the desired implementation, the context database can manage forbidden procedures in the inspected event graph. In such an example implementation, processor(s) 1210 can be configured to execute the method or instructions as described above and further involve, for the generated context labels including one of the forbidden procedures, raising an alert regarding non-compliance of standard operating procedure as described with respect to FIG. 9.

Processor(s) 1210 can be configured to execute the method or instructions as described herein, and further involve identifying a task from the generated context labels; and determining a cycle time for the identified task from a length of video across the generated context labels associated from the identified task as described with respect to FIG. 10. In an example implementation, the estimated duration between each task can be aggregated to determine the cycle time.

Processor(s) 1210 can be configured to execute the method or instructions as described above, and further involve, for one or more of the generated context labels indicative of an abnormal event, providing an indication that an abnormal event has occurred. For example, if an alert needs to be raised in view of an abnormal event associated with a node in the inspected event graph, then the event can be detected through the example implementations described herein and indicate that an abnormal event has occurred.

Processor(s) 1210 can be configured to execute the method or instructions as described herein, and further involve storing the generated context labels with the video to index the video in a search engine. In example implementations, because each of the generated context labels are associated with times within the video, the context labels along with their corresponding timestamps and durations can be provided to a search engine to index the video based on time and/or label in accordance with the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing." "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:

for receipt of a video for processing:

executing a zero shot image labeler on the video to generate a plurality of labels corresponding to images of the video;

calculating an image embedding vector for each of the labels of the images;

generating context labels to replace the each of the labels corresponding to each of the images based on the context labels determined for current and previous images in time by referencing a context database with the image embedding vector to determine the context labels from an inspected event graph, wherein nodes of the event graph are indicative of events that can happen during a duration of the video; and replacing the each of the plurality of labels with the generated context labels;

identifying a task from the generated context labels; and determining a cycle time for the identified task from a length of the video across the generated context labels associated from the identified task.

2. The method of claim 1, wherein the context database manages an association between event embedding vectors and context information with each of the nodes in the inspected event graph.

3. The method of claim 1, wherein the generating context labels to replace the each of the labels corresponding to each of the images comprises determining a node from the inspected event graph associated with an event embedding vector in the context database having a smallest distance from the image embedding vector; and generating the context labels from context information associated with the node.

4. The method of claim 3, wherein each node is associated with an estimated duration in the context database;

wherein a calculated distance between the image embedding vector and the event embedding vector is weighted based on a duration of time between the images of the video and the current and previous images in time associated with a same context label, in comparison to the estimated duration.

5. The method of claim 1, wherein the context database manages forbidden procedures in the inspected event graph, wherein the method further comprises, for the generated context labels including one of the forbidden procedures, raising an alert regarding non-compliance of standard operating procedure.

US 12,694,675 B2

13

6. The method of claim 1, further comprising, for one or more of the generated context labels indicative of an abnormal event, providing an indication that the abnormal event has occurred.

7. The method of claim 1, further comprising:

storing the generated context labels with the video to index the video in a search engine.

8. A system, comprising:

a context database; and a processor, configured to:

for receipt of a video for processing:

execute an image labeler on the video to generate a plurality of labels corresponding to images of the video;

calculate a zero shot image embedding vector for each of the labels of the images;

generate context labels to replace the each of the labels corresponding to each of the images based on the context labels determined for current and previous images in time by referencing the context database with the image embedding vector to determine the context labels from an inspected event graph, wherein nodes of the event graph are indicative of events that can happen during a duration of the video;

replace the each of the plurality of labels with the generated context labels;

identify a task from the generated context labels; and determine a cycle time for the identified task from a length of video across the generated context labels associated from the identified task.

9. The system of claim 8, wherein the context database manages an association between event embedding vectors and context information with each of the nodes in the inspected event graph.

10. The system of claim 8, wherein the processor is configured to generate context labels to replace the each of the labels corresponding to each of the images by determining a node from the inspected event graph associated with an event embedding vector in the context database having a smallest distance from the image embedding vector; and generating the context labels from context information associated with the node.

11. The system of claim 10, wherein each node is associated with an estimated duration in the context database, wherein a calculated distance between the image embedding vector and the event embedding vector is weighted based on a duration of time between the images of the video and the current and previous images in time associated with a same context label, in comparison to the estimated duration.

12. The system of claim 8, wherein the context database manages forbidden procedures in the inspected event graph, wherein the instructions further comprise, for the generated context labels including one of the forbidden procedures, raising an alert regarding non-compliance of standard operating procedure.

13. The system of claim 8, wherein the processor is further configured to:

for one or more of the generated context labels indicative of an abnormal event, provide an indication that the abnormal event has occurred.

14. The system of claim 8, wherein the processor is further configured to:

storing the generated context labels with the video to index the video in a search engine.

*   *   *   *   *